United States Patent
Smith et al.

(10) Patent No.: US 11,694,153 B2
(45) Date of Patent: Jul. 4, 2023

(54) SYSTEMS AND METHODS FOR ELECTRONICALLY PROCESSING PICKUP OF RETURN ITEMS FROM A CUSTOMER

(71) Applicant: WALMART APOLLO, LLC, Bentonville, AR (US)

(72) Inventors: Austin Lee Smith, Burlingame, CA (US); Vidyanand Krishnan, Sunnyvale, CA (US); Michael Gilbert Ebener, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1069 days.

(21) Appl. No.: 15/623,252

(22) Filed: Jun. 14, 2017

(65) Prior Publication Data
US 2018/0365644 A1 Dec. 20, 2018

(51) Int. Cl.
*G06Q 10/08* (2023.01)
*G06Q 10/0837* (2023.01)

(52) U.S. Cl.
CPC .............................. *G06Q 10/0837* (2013.01)

(58) Field of Classification Search
CPC .................... G06Q 10/083; G06Q 10/0837
See application file for complete search history.

(56) References Cited

U.S. PATENT DOCUMENTS

| | | | |
|---|---|---|---|
| 7,716,091 B2 * | 5/2010 | Ross | G06Q 10/087 235/383 |
| 9,697,548 B1 * | 7/2017 | Jaff | G06Q 30/0601 |
| 2002/0178076 A1 * | 11/2002 | Ross | G06Q 30/0601 705/28 |
| 2011/0231235 A1 * | 9/2011 | MacIlwaine | G06Q 30/02 705/14.17 |
| 2013/0173490 A1 * | 7/2013 | Shroff | G06Q 30/01 705/340 |
| 2014/0006199 A1 * | 1/2014 | Grigg | G06Q 30/06 705/26.1 |

(Continued)

OTHER PUBLICATIONS

Gadgets 360 staff, "How to return Items purchased on Amazon", published by Gadgets360, on May 11, 2017 (Year: 2017).*

(Continued)

*Primary Examiner* — Resha Desai
*Assistant Examiner* — Michelle E Carey
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving a return request for an item from a customer electronic device of a customer, determining that the return request is available for a pickup return option for (1) pickup, by a driver, of the item at an address associated with the customer and (2) transportation, by the driver, of the item from the address to the store, and, if the customer selects a pickup return option: assigning the driver to pick up the item from the address and transport the item to the store, receiving a return scan for the item from a store electronic device at the store or from a driver electronic device, and initiating a refund to the customer for the item.

20 Claims, 5 Drawing Sheets

(56) References Cited

U.S. PATENT DOCUMENTS

| | | | | |
|---|---|---|---|---|
| 2014/0201001 | A1* | 7/2014 | Rellas | G06Q 30/0261 |
| | | | | 705/14.58 |
| 2015/0100514 | A1* | 4/2015 | Parris | G06Q 10/083 |
| | | | | 705/340 |
| 2016/0098677 | A1* | 4/2016 | Kim | G06Q 10/08355 |
| | | | | 705/333 |
| 2016/0104112 | A1* | 4/2016 | Gorlin | G06Q 10/06311 |
| | | | | 705/338 |
| 2016/0140490 | A1* | 5/2016 | Kuper | G06N 7/005 |
| | | | | 705/28 |
| 2016/0364678 | A1* | 12/2016 | Cao | G06Q 50/30 |
| 2016/0364823 | A1* | 12/2016 | Cao | G06Q 50/30 |
| 2016/0379167 | A1* | 12/2016 | Raman | G06Q 10/1097 |
| | | | | 705/338 |
| 2017/0098188 | A1* | 4/2017 | Aryeetey | G06Q 10/0833 |
| 2017/0262804 | A1* | 9/2017 | Shroff | G06Q 10/0833 |
| 2017/0330144 | A1* | 11/2017 | Wakim | G01C 21/34 |
| 2018/0012178 | A1* | 1/2018 | Ramirez | G06Q 10/0833 |
| 2019/0102146 | A1* | 4/2019 | Swift | H04W 4/40 |
| 2020/0005239 | A1* | 1/2020 | Elgrably | G06Q 10/083 |

OTHER PUBLICATIONS

Ehling, Jeff, "Returning a gift? Here's what you need to know," ABC 13 Eyewitness news, Dec. 25, 2014, https://abc13.com/returning-gifts-gift-returns-tips-return/449949/ (Year: 2014).* https://www.amazon.com/gp/help/customer/display.html?nodeId=200572810; AMAZON; "About Return Shipping Methods"; Mar. 13, 2017.

https://www.ups.com/content/us/en/shipping/time/service/value_added/returns_plus.html; UPS: UPS Returns Plus; Mar. 13, 2017.

https://www.fedex.com/grd/rpp/ShowRPP.do; FED EX Ground / Return Package Pickup; Mar. 13, 2017.

* cited by examiner

400

| 405 – Receiving a return request for one or more items from a customer electronic device of a customer. |

| 410 – Determining that the return request is available for a pickup return option. |

| 415 – Coordinating displaying the pickup return option on the customer electronic device. |

| 420 – Assigning the driver to pick up the one or more items from the first address associated with the customer and transport the one or more items to the store. |

| 425 – Coordinating displaying the first address associated with the customer on a driver electronic device of the driver. |

| 430 – Receiving one or more return scans for the one or more items from a store electronic device at the store or from the driver electronic device. |

| 435 – Initiating a refund to the customer for the one or more items. |

FIG. 4

SYSTEMS AND METHODS FOR ELECTRONICALLY PROCESSING PICKUP OF RETURN ITEMS FROM A CUSTOMER

TECHNICAL FIELD

This disclosure relates generally to electronically processing pickup of return items from a customer.

BACKGROUND

Customers of both online retailers and brick and mortar retailers often determine that one or more items purchased by the customers are unwanted by the customers. To return an unwanted item, traditional systems require a customer to either (1) drive to a store or (2) box and label the unwanted item and then ship the item to the retailer. In systems where the customer is required to ship the unwanted item to the retailer to return the item, the act of refunding money to the customer does not occur until the item arrives at the return center and the return is processed at the return center. This process typically takes at least one or more days.

BRIEF DESCRIPTION OF THE DRAWINGS

To facilitate further description of the embodiments, the following drawings are provided in which:

FIG. 4 is a flowchart for a method, according to certain embodiments; and

Figure 1:
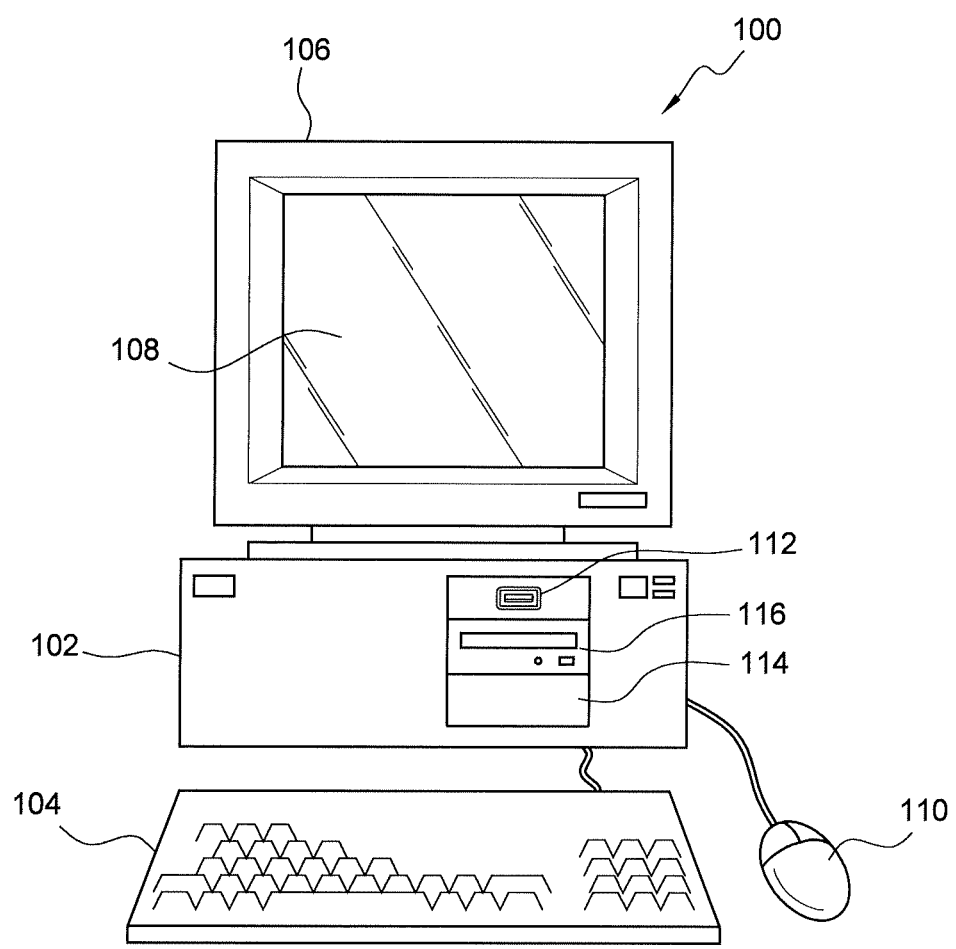
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a return request for one or more items from a customer electronic device of a customer. The one or more items can be one or more items previously purchased by the customer from a store. The one or more storage modules can be further configured to run on the one or more processing modules and perform an act of determining that the return request is available for a pickup return option for (1) pickup, by a driver, of the one or more items at a first address associated with the customer and (2) transportation, by the driver, of the one or more items from the first address associated with the customer to the store. The one or more storage modules can be further configured to run on the one or more processing modules and perform an act of coordinating displaying the pickup return option on the customer electronic device. The one or more storage modules can be further configured to run on the one or more processing modules and perform an act of, if the customer selects the pickup return option, assigning the driver to pick up the one or more items from the first address associated with the customer and transport the one or more items to the store. The one or more storage modules can be further configured to run on the one or more processing modules and perform an act of, if the customer selects the pickup return option, coordinating displaying the first address associated with the customer on a driver electronic device of the driver. The one or more storage modules can be further configured to run on the one or more processing modules and perform an act of, if the customer selects the pickup return option, receiving one or more return scans for the one or more items from a store electronic device at the store or from the driver electronic device. The one or more storage modules can be further configured to run on the one or more processing modules and perform an act of, if the customer selects the pickup return option and in response to receiving the one or more return scans, initiating a refund to the customer for the one or more items. The return request can be received through a computer network. Coordinating displaying the pickup return option, assigning the driver, coordinating displaying the first address, receiving the one or more return scans, and initiating the refund can occur through the computer network.

Figure 2:
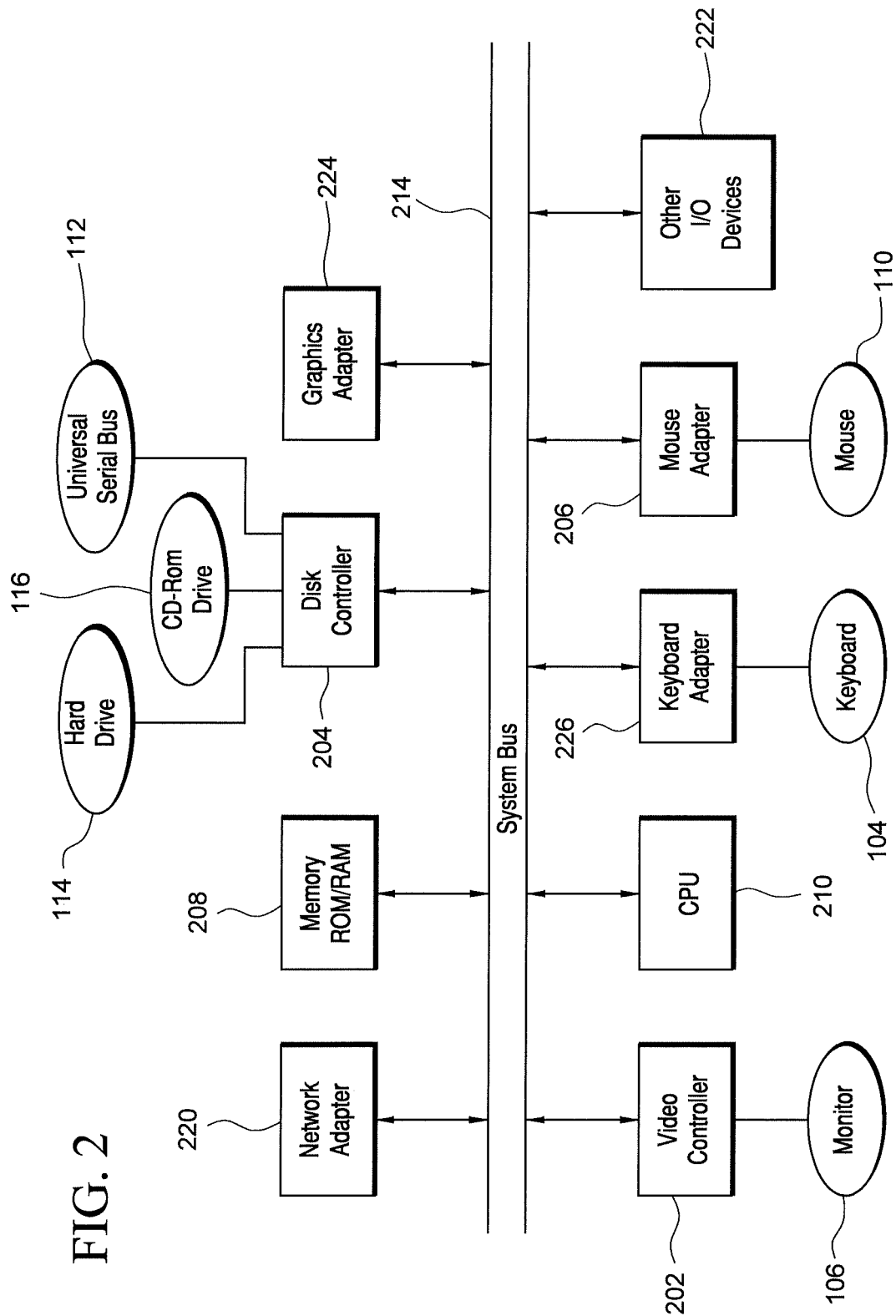
FIG. 2 illustrates a representative block diagram of an example of the elements included in the circuit boards inside a chassis of the computer system of FIG. 1.

Various embodiments include a method. The method can include receiving a return request for one or more items from a customer electronic device of a customer. The one or more items can be one or more items previously purchased by the customer from a store. The method also can include determining that the return request is available for a pickup return option for (1) pickup, by a driver, of the one or more items at a first address associated with the customer and (2) transportation, by the driver, of the one or more items from the first address associated with the customer to the store. The method also can include coordinating displaying the pickup return option on the customer electronic device. The method also can include, if the customer selects the pickup return option, assigning the driver to pick up the one or more items from the first address associated with the customer and transport the one or more items to the store. The method also can include, if the customer selects the pickup return option, coordinating displaying the first address associated with the customer on a driver electronic device of the driver. The method also can include, if the customer selects the pickup return option, receiving one or more return scans for the one or more items from a store electronic device at the store or from the driver electronic device. The method also can include, if the customer selects the pickup return option, in response to receiving the one or more return scans, initiating a refund to the customer for the one or more items. The return request can be received through a computer network. Coordinating displaying the pickup return option, assigning the driver, coordinating displaying the first address, receiving the one or more return scans, and initiating the refund can occur through the computer network Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
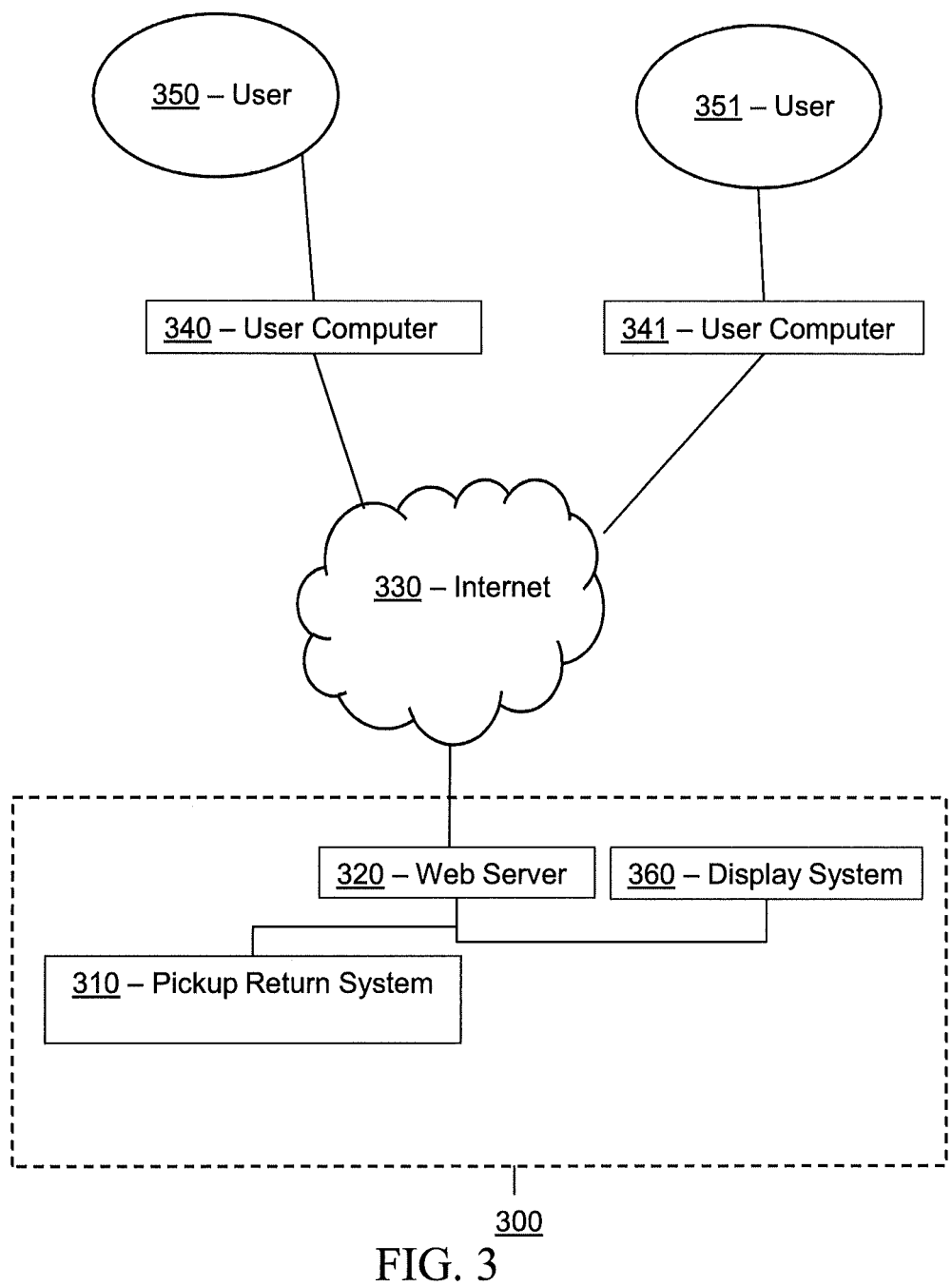
FIG. 3 illustrates a representative block diagram of a system, according to an embodiment.

Turning ahead in the drawings, FIG. 3 illustrates a block diagram of a system 300 that can be employed for electronically processing pickup of return items from a customer, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a pickup return system 310, a web server 320, and a display system 360. Pickup return system 310, web server 320, and display system 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of pickup return system 310, web server 320, and display system 360. Additional details regarding pickup return system 310, web server 320, and display system 360 are described herein.

In many embodiments, system 300 also can comprise user computers 340, 341. In some embodiments, user computers 340, 341 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce web site that allows users to browse and/or search for products, to add products to an electronic shopping cart, and/or to purchase products, in addition to other suitable activities.

In many embodiments, pickup return system 310, web server 320, and/or display system 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) pickup return system 310, web server 320, and/or display system 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of pickup return system 310, web server 320, and/or display system 360. In a similar manner, the processing module(s) and the memory storage module(s) can be local and/or remote to each other.

In many embodiments, pickup return system 310, web server 320, and/or display system 360 can be configured to communicate with one or more user computers 340 and 341. In some embodiments, user computers 340 and 341 also can be referred to as customer computers. In some embodiments, pickup return system 310, web server 320, and/or display system 360 can communicate or interface (e.g., interact) with one or more customer computers (such as user computers 340 and 341) through a network or internet 330. Internet 330 can be an intranet that is not open to the public. Accordingly, in many embodiments, pickup return system 310, web server 320, and/or display system 360 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, pickup return system 310, web server 320, and/or display system 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between pickup return system 310, web server 320, display system 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
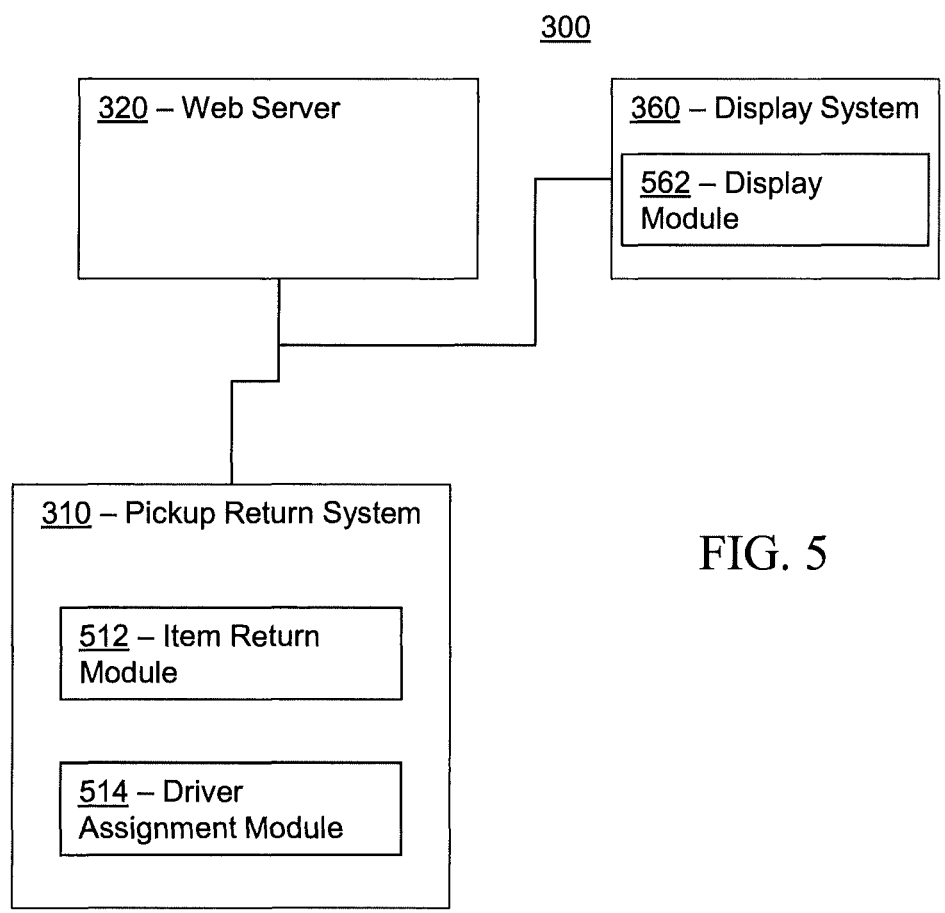
FIG. 5 illustrates a representative block diagram of a portion of the system of FIG. 3, according to an embodiment.

Turning ahead in the drawings, FIG. 4 illustrates a flow chart for a method 400, according to an embodiment. As described in greater detail below, various embodiments of method 400 provide customers of a store the opportunity to return unwanted items from the convenience of their own homes. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, and/or 562 (FIG. 5). Such non-transitory memory storage modules can be part of a computer system such as pickup return system 310, web server 320, and/or display system 360 (FIGS. 3 & 5). The processing module(s) can be similar or identical to the processing module(s) described above with respect to computer system 100 (FIG. 1).

Method 400 can comprise an activity 405 of receiving a return request for one or more items from a customer electronic device of a customer. In some embodiments, the one or more items of the return request can be one or more items that were previously purchased by the customer from a store. The store can be a brick and mortar retail store or an online store regardless of association with a brick and mortar store. For example, in some embodiments, the one or more items of the return request can be one or more items that were previously purchased by the customer from a website associated with the store and delivered to the customer. Alternatively, the one or more items of the return request can be one or more items that were previously purchased by the customer from a brick and mortar store. The one or more items previously purchased by the customer from the brick and mortar store can comprise (1) one or more items that were delivered to the first address associated with the customer, (2) one or more items that were collected at the brick and mortar store by a store employee and picked up at the store by the customer, and/or (3) one or more items that the customer collected and purchased at the brick and mortar store. As an example, the unique identifier can be a universal product code (UPC) barcode, a quick response (QR) code, a global trade item number (GTIN), and the like.

In many embodiments, the customer electronic device can comprise a mobile electronic device such as a watch or a phone, a tablet electronic device, a desktop electronic device, and/or any other electronic device described herein. The return request can comprise unique identifiers for the one or more items as entered by the customer. In other embodiments, the customer can use a camera on the customer electronic device to capture (1) the unique identifiers for the one or more items and/or (2) a receipt for the one or more items.

Method 400 also can comprise an activity 410 of determining that the return request is available for a pickup return option. In many embodiments, the pickup return option can be for (1) pickup, by a driver, of the one or more items at a first address associated with the customer and (2) transportation, by the driver, of the one or more items from the first address associated with the customer to the store. The first address associated with the customer can comprise a residence address of the customer, a work address of the customer, or any other address chosen by the customer. In many embodiments, the store can be a fulfillment center associated with an online store and/or a brick and mortar store, a warehouse associated with the online store and/or the brick and mortar store, a distribution center associated with the online store and/or the brick and mortar store, or a brick and mortar retail store. For example, in some embodiments, the pickup return option can be for (1) pickup, by the driver, of the one or more items at the first address associated with the customer, and (2) transportation, by the driver, of the one or more items from the first address to the brick and mortar retail store. In these and other embodiments, the brick and mortar store can be the same brick and mortar store from which the customer purchased the one or more items, or a different brick and mortar store than the brick and mortar store from which the customer purchased the one or more items.

In some embodiments, the quantity, size, weight, and/or type of product can affect whether the return request is available for the pickup return option. In some embodiments, a zip or postal code of the first address can affect whether the return request is available for the pickup return option. For example, the pickup return option can, in some embodiments, be available only in certain zip or postal codes. In some embodiments, system 300 (FIG. 3) can use a previously entered or otherwise known zip or postal code to determine whether the return request is available for the pickup return option. In other embodiments, the customer can enter and system 300 (FIG. 3) can receive a zip code to determine if the return request is available for the pickup return option. The driver can be an employee of the store or, alternatively, can be a driver for a third-party service such as but not limited to a third-party crowd-source delivery service.

The pickup return option can be advantageous for various reasons. For example, as shall be described in greater detail below, the one or more items of the return request can be picked up by a driver when the driver is delivering or collecting other items from other customers within a certain predetermined proximity of the first address. By reducing carbon emissions associated with each of the returns and/or deliveries, the pickup return option can promote a green ecosystem that is beneficial to the environment. Moreover, the customer is not required to box or label the one or more items for shipping before the driver picks up on the one or more items. Conventional systems typically require customers to box (or at least package) and/or label items for return.

In some embodiments, activity 410 and other activities in method 400 can comprise using a distributed network comprising distributed memory architecture to perform the associated activity. This distributed architecture can reduce the impact on the network and system resources to reduce congestion in bottlenecks while still allowing data to be accessible from a central location.

Method 400 also can comprise an activity 415 of coordinating displaying the pickup return option on the electronic device of the customer and/or generating instructions for providing an interface that displays the pickup return option on the electronic device of the customer. For example, after determining that the return request is available for a pickup return option, system 300 (FIG. 3) can generate instructions and/or coordinate displaying a message on the customer electronic device that promotes the pickup return option or otherwise informs the customer that the pickup return option is available for the customer.

In some embodiments, activity 415 can optionally comprise additional activities before and/or after coordinating displaying the pickup return option. For example, activity 415 also can comprise determining one or more windows of time the driver will be within a predetermined proximity to the first address to (1) deliver one or more additional orders from the store to one or more additional addresses, and/or (2) pick up at least one additional order from at least one additional address to return to the store. Each window of time of the one or more windows of time can comprise a predetermined time period, such as a 10-minute window of time, a 15-minute window of time, a 30-minute window of time, a 60-minute window of time, and so on.

In some embodiments, the one or more additional addresses can be within a second predetermined proximity to the first address, and/or (1) the one or more additional address can be en route from the store to the first address, or (2) the first address can be en route from the store to the one or more additional addresses (or vice versa). Similarly, the at least one additional address can be within a second predetermined proximity to the first address, and/or (1) the at least one additional address can be en route from the store to the first address (or vice versa), or (2) the first address can be en route from the store to the at least one additional address (or vice versa).

After the one or more windows of time the driver will be within the predetermined proximity to the first address have been determined, activity 415 can optionally further comprise an activity of coordinating displaying the one or more windows of time on the customer electronic device and/or generating instructions for providing an interface that displays the one or more windows of time on the customer electronic device. Activity 415 can then optionally further comprise receiving, from the customer electronic device, a selection of at least one window of time of the one or more windows of time as selected by the customer. These activities allow a customer to select when the customer would like the driver to come to the first address to pick up the one or more items.

In some embodiments activity 415 can optionally comprise additional activities before and/or after coordinating displaying the pickup return option. For example, in some embodiments, activity 415 also can comprise determining that the driver is not available to pick up the one or more items when the customer selects the pickup return option. For example, while the return request may qualify for the pickup return option and the customer selects the pickup return option, there may not be any drivers available to pick up the one or more items. To solve this problem, system 300 (FIG. 3) can continuously and/or periodically check to determine if any drivers are available to pick up on the one or more items at the first address of the customer. When system 300 (FIG. 3) determines that a driver is available to pick up the one or more items at the first address of the customer, activity 415 can further comprise coordinating transmitting an alert to the customer electronic device when the driver is available to pick up the one or more items at the first address. The alert can comprise a text message, a push notification on the customer electronic device, an email, a phone call, and the like.

Method 400 also can comprise an activity 420 of, if the customer selects the pickup return option, assigning the driver to pick up the one or more items from the first address associated with the customer and transport the one or more items to the store. In some embodiments activity 420 can optionally comprise assigning the driver to pick up the one or more items from the first address associated with the customer within the at least one window of time of the one or more windows of time and transport the one or more items to the store. Activity 420 can, in some embodiments, be based on one or more additional delivery and/or one or more additional pickup returns scheduled for the driver.

Method 400 also can comprise an activity 425 of, if the customer selects the pickup return option, coordinating displaying and/or generating instructions for providing an interface on the customer electronic device that displays the first address associated with the customer on a driver electronic device of the driver. In some embodiments, activity 425 can optionally comprise coordinating displaying (1) the first address associated with the customer and (2) the at least one window of time on the driver electronic device.

In some embodiments, method 400 can optionally comprise an activity of, if the customer selects the pickup return option, coordinating displaying on the customer electronic device a location of the driver and/or generating instructions for providing an interface on the customer electronic device that displays the location of the driver when the driver is at least one of (1) en route to the first address to pick up the one or more items or (2) en route from the first address to the store after the driver has picked up the one or more items from the first address. This activity allows the customer to monitor the progress of the driver in the pickup process. In some embodiments, system 300 also can display additional pickups and/or deliveries that the driver must make on the way to pick up the one or more items from the first customer and/or on the way to the store after picking up the one or more items from the first customer.

Method 400 also can comprise an activity 430 of, if the customer selects the pickup return option, receiving one or more return scans for the one or more items from a store electronic device at the store or from the driver electronic device. Thus, in some embodiments, the driver can perform one or more return scans while at the first address associated with the customer. For example, if the driver performs the one or more return scans for the one or more items, one or more first return scans can be performed when the one or more items are picked up by the driver at the first address associated with the customer. The driver also can perform a second scan of the one or more items when the driver drops off the one or more items at the store. Alternatively, another employee of the store can perform the second scan of the one or more items when the driver drops off the one or more items at the store. In other embodiments, the one or more return scans are performed only at the store.

Method 400 also can comprise an activity 435 of, if the customer selects the pickup return option and in response to receiving the one or more return scans, initiating a refund to the customer for the one or more items. In some embodiments, activity 435 can comprise, in response to receiving the one or more return scans, initiating the refund to the customer for the one or more items immediately after receiving the one or more return scans from the driver electronic device when the driver picks up the one or more items from the first address. In other embodiments, activity 435 can comprise initiating the refund to the customer for the one or more items immediately after receiving the one or more returns scans from the store electronic device at the store. This activity between electronic devices also is advantageous to conventional systems because the actual act of refunding the money spent on the item can be immediate. In conventional systems where items are shipped back to a retailer from the customer, the actual act of refunding the money spent on the item does not occur until the item is processed at the return center.

FIG. 5 illustrates a block diagram of a portion of system 300 comprising pickup return system 310, web server 320, and display system 360, according to the embodiment shown in FIG. 3. Each of pickup return system 310, web server 320, and display system 360, is merely exemplary and not limited to the embodiments presented herein. Each of pickup return system 310, web server 320, and/or display system 360, can be employed in many different embodiments or examples not specifically depicted or described herein. In some embodiments, certain elements or modules of pickup return system 310, web server 320, and/or display system 360, can perform various procedures, processes, and/or acts. In other embodiments, the procedures, processes, and/or acts can be performed by other suitable elements or modules.

In many embodiments, pickup return system 310 can comprise non-transitory memory storage module 512. Memory storage module 512 can be referred to as item return module 512. In many embodiments, item return module 512 can store computing instructions configured to run on one or more processing modules and perform one or more acts of method 400 (FIG. 4) (e.g., activity 405 of receiving a return request for one or more items from a customer electronic device of a customer, activity 430 of receiving one or more return scans for the one or more items from a store electronic device at the store or from the driver electronic device, and activity 435 of initiating a refund to the customer for the one or more items (FIG. 4)).

In many embodiments, pickup return system 310 also can comprise non-transitory memory storage module 514. Memory storage module 514 can be referred to as driver assignment module 514. In many embodiments, driver assignment module 514 can store computing instructions configured to run on one or more processing modules and perform one or more acts of method 400 (FIG. 4) (e.g., activity 410 of determining that the return request is available for a pickup return option, and activity 420 of assigning the driver to pick up the one or more items from the first address associated with the customer and transport the one or more items to the store (FIG. 4)).

In many embodiments, display system 360 can comprise non-transitory memory storage module 562. Memory storage module 562 can be referred to as display module 562. In many embodiments, display module 562 can store computing instructions configured to run on one or more processing modules and perform one or more acts of method 400 (FIG. 4) (e.g., activity 415 of coordinating displaying the pickup return option on the customer electronic device, and activity 425 of coordinating displaying the first address associated with the customer on a driver electronic device of the driver (FIG. 4)).

Although systems and methods for electronically processing pickup of return items from a customer have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform functions comprising:
receiving a return request for one or more items from a user electronic device of a user, wherein the one or more items previously purchased by the user from a store were delivered to a first address of the user, wherein each of the one or more items comprise a respective barcode, wherein each of the one or more items were delivered to the first address of the user, and wherein the return request is initiated when the respective barcode for the one or more items is scanned by a camera on the user electronic device of the user;
determining that the return request is available for a pickup return option for:
(1) pickup, by a driver, of the one or more items at the first address associated with the user; and
(2) transportation, by the driver, of the one or more items from the first address associated with the user to a second store different than the store;
causing the user electronic device to display the pickup return option on the user electronic device; and
upon receiving a selection of the pickup return option from the user electronic device:
receiving a selection, from the user electronic device, of one or more windows of time for the driver to arrive at the first address of the user to pick up the one or more items; and
checking for drivers that are available to pick up the one or more items at the first address of the user during at least one window of time indicated by the selection of the one or more windows of time;
when the driver of the drivers is available during the at least one window of time indicated by the selection of the one or more windows of time to pick up the one or more items at the first address of the user:
coordinating transmitting one or more alerts to the user electronic device of the user to notify the user about the return request;
assigning the driver to:
(1) pick up the one or more items from the first address associated with the user during the at least one window of time indicated by the selection of the one or more windows of time; and
(2) transport the one or more items to the second store;
causing a driver electronic device of the driver to display the first address associated with the user;
receiving one or more driver acceptance scans for the one or more items from the driver electronic device of the driver;
receiving one or more return scans for the one or more items from a store electronic device at the second store;
in response to receiving the one or more return scans, initiating a refund to the user for the one or more items, wherein:
the return request is received through a computer network;
causing the user electronic device to display the pickup return option, assigning the driver, causing the driver electronic device of the driver to display the first address, receiving the one or more return scans, and initiating the refund occur through the computer network; and
determining that the return request is available for the pickup return option comprises:
evaluating a zip code of the first address associated with the user, a quantity of the one or more items, and a weight of the one or more items.

2. The system of claim 1, wherein the one or more items were previously purchased by the user from a website associated with the store and delivered to the user.

3. The system of claim 1, wherein:
the store comprises a brick and mortar store; and
the one or more items were previously purchased by the user from the brick and mortar store.

4. The system of claim 1, wherein:
the computing instructions, when executed on the one or more processors, further cause the one or more processors to perform functions comprising:
determining the one or more windows of time when the driver will be within a predetermined proximity to the first address to:
(1) deliver one or more additional orders from the store to one or more additional addresses; or
(2) pick up at least one additional order from at least one additional address to return to the second store; and
receiving, from the user electronic device, the selection of the at least one window of time of the one or more windows of time as selected by the user; and
causing the driver electronic device of the driver to display the first address associated with the user comprises:
causing the driver electronic device of the driver to display (1) the first address associated with the user and (2) the at least one window of time on the driver electronic device.

5. The system of claim 1, wherein the computing instructions, when executed on the one or more processors, cause the one or more processors to perform a function comprising:
when the user selects the pickup return option:
generating instructions for providing an interface on the user electronic device that displays a location of the driver when the driver is at least one of:
(1) en route to the first address to pick up the one or more items; or
(2) en route from the first address to the second store after the driver has picked up the one or more items from the first address.

6. The system of claim 1, wherein:
initiating the refund to the user for the one or more items comprises:
in response to receiving the one or more return scans, automatically initiating the refund to the user for the one or more items after receiving the one or more return scans from the store electronic device when the driver drops off the one or more items at the second store.

7. The system of claim 1, wherein the driver is an employee of the store or the second store.

8. The system of claim 1, wherein the user is not required to box or label the one or more items for shipping before the driver picks up the one or more items.

9. The system of claim 1, wherein the return request comprises one or more scans of one or more respective barcodes of the one or more items.

10. The system of claim 1, wherein the one or more items do not need to be packed or labeled before being returned to the second store.

11. A method being implemented via execution of computing instructions configured to run on one or more processors stored at non-transitory computer-readable media, the method comprising:
receiving a return request for one or more items from a user electronic device of a user, wherein the one or more items previously purchased by the user from a store were delivered to a first address of the user, wherein each of the one or more items comprise a respective barcode unique identifier, wherein each of the one or more items were delivered to the first address of the user, and wherein the return request is initiated when the respective barcode for the one or more items is scanned by a camera on the user electronic device of the user;
determining that the return request is available for a pickup return option for:
(1) pickup, by a driver, of the one or more items at the first address associated with the user; and
(2) transportation, by the driver, of the one or more items from the first address associated with the user to a second store different than the store;
causing the user electronic device to display the pickup return option on the user electronic device; and
upon receiving a selection of the pickup return option from the user electronic device:
receiving a selection, from the user electronic device, of one or more windows of time for the driver to arrive at the first address of the user to pick up the one or more items; and
checking for drivers that are available to pick up the one or more items at the first address of the user during at least one window of time indicated by the selection of the one or more windows of time;
when the driver of the drivers is available during the at least one window of time indicated by the selection of the one or more windows of time to pick up the one or more items at the first address of the user:
coordinating transmitting one or more alerts to the user electronic device of the user to notify the user about the return request;
assigning the driver to:
(1) pick up the one or more items from the first address associated with the user during the at least one window of time indicated by the selection of the one or more windows of time; and
(2) transport the one or more items to the second store;
causing a driver electronic device of the driver to display the first address associated with the user;
receiving one or more driver acceptance scans for the one or more items from the driver electronic device of the driver;
receiving one or more return scans for the one or more items from a store electronic device at the second store;
in response to receiving the one or more return scans, initiating a refund to the user for the one or more items, wherein:
the return request is received through a computer network;
causing the user electronic device to display the pickup return option, assigning the driver, causing the driver electronic device of the driver to display the first address, receiving the one or more return scans, and initiating the refund occur through the computer network; and
determining that the return request is available for the pickup return option comprises:
evaluating a zip code of the first address associated with the user, a quantity of the one or more items, and a weight of the one or more items.

12. The method of claim 11, wherein the one or more items were previously purchased by the user from a website associated with the store and delivered to the user.

13. The method of claim 11, wherein:
the store comprises a brick and mortar store; and
the one or more items were previously purchased by the user from the brick and mortar store.

14. The method of claim 11, wherein:
the method further comprises:
determining the one or more windows of time when the driver will be within a predetermined proximity to the first address to:
(1) deliver one or more additional orders from the store to one or more additional addresses; or
(2) pick up at least one additional order from at least one additional address to return to the second store; and
receiving, from the user electronic device, the selection of the at least one window of time of the one or more windows of time as selected by the user; and
causing the driver electronic device of the driver to display the first address associated with the user comprises:
causing the driver electronic device of the driver to display (1) the first address associated with the user and (2) the at least one window of time on the driver electronic device.

15. The method of claim 11, wherein the method further comprises, when the user selects the pickup return option:
generating instructions for providing an interface on the user electronic device that displays a location of the driver when the driver is at least one of:
(1) en route to the first address to pick up the one or more items; or
(2) en route from the first address to the second store after the driver has picked up the one or more items from the first address.

16. The method of claim 11, wherein:
initiating the refund to the user for the one or more items comprises:
in response to receiving the one or more return scans, automatically initiating the refund to the user for the one or more items after receiving the one or more return scans from the store electronic device when the driver drops off the one or more items at the second store.

17. The method of claim 11, wherein the driver is an employee of the store or the second store.

18. The method of claim 11, wherein the user is not required to box or label the one or more items for shipping before the driver picks up the one or more items.

19. The method of claim 11, wherein the return request comprises one or more scans of one or more respective barcodes of the one or more items.

20. The method of claim 11, wherein the one or more items do not need to be packed or labeled before being returned to the second store.

* * * * *